May 10, 1955     M. L. BEESON     2,707,897
EXPANDING, UNDERCUTTING INSERT
Filed May 4, 1948
FIG. 1.
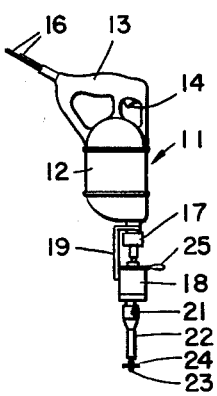
FIG. 2.
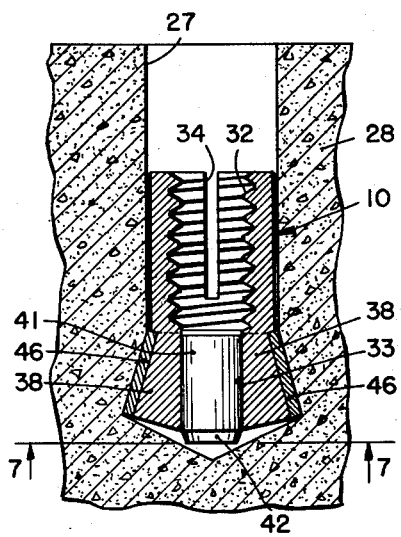
FIG. 3.
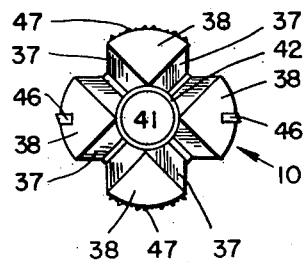
FIG. 4.
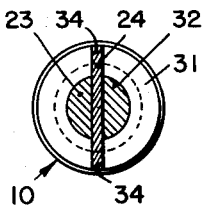
FIG. 5.
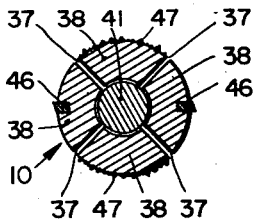
FIG. 7.
FIG. 6.
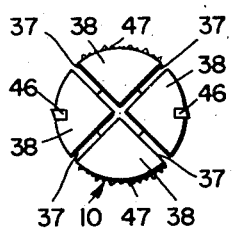
INVENTOR
MARTIN L. BEESON
BY
ATTORNEY United States Patent Office 2,707,897
Patented May 10, 1955

2,707,897

EXPANDING, UNDERCUTTING INSERT

Martin L. Beeson, South Pasadena, Calif., assignor of one-half to William Douglas Sellers, Pasadena, Calif.

Application May 4, 1948, Serial No. 25,059

4 Claims. (Cl. 85—2)

The present invention relates to tubular inserts in general and particularly to a new and improved expandible tubular insert and to the method by which it may be installed. More specifically the invention comprises an insert adapted to be positioned within a hole in material such as concrete, and to be positively locked in retaining engagement therewith by forming its own tapered undercut in the hole in which it is expanded and locked.

Many materials into which mountings and brackets, etc. must be secured are inherently unsatisfactory for the permanent engagement of securing means. These materials include concrete, soft metals, certain plastics and marble. In order satisfactorily to attach mounting or securing means in bodies of such material the practice has been followed of providing a cylindrical hole in the material and inserting therein a tubular insert which is positively locked in place as by forcing radially projecting spurs into the material.

The devices which have heretofore been used have not been completely satisfactory. In hard concrete the penetration possible under direct driving action is relatively limited. The material into which the spur or anchoring arm is driven is not removed but is merely disintegrated or compressed. While a locking engagement is effected it is one subject to deterioration with the passage of time through displacement and decomposition of material, electrolysis, etc., until finally it becomes loosened and even displaceable. Where inserts are used in connection with mountings supporting overhead pipes and conduits, etc. such aging and deterioration is critical and undesirable.

The insert constructed and positioned in accordance with the present invention is positively locked in position and cannot be displaced. After literally cutting for itself a tapered undercut in the enclosing bore or hole the unit is locked in an expanded condition in which it extends in the undercut. There are no forces to displace the locking means and the unit is in contact with enclosing material which is uncompressed and unweakened. The operation is accomplished by a novel method in which the unit is simultaneously rotated in the enclosing hole while being subjected to a hammering action to effect a lateral expansion of its cutting surfaces whereby an undercut tapered section is produced.

Referring now to the drawing in which a preferred embodiment of the invention is illustrated:

Figure 1 is a side elevation of the tool used in performing the method by which the insert is permanently seated within a hole;

Figure 2 is an enlarged vertical section through a hole in which an insert constructed in accordance with the present invention has been positioned and shows the abutting end of the tool of Figure 1 extended into the hole and ready to begin the seating operation;

Figure 3 is a vertical section through a hole in which the unit constructed in accordance with the present invention is permanently locked at the conclusion of the seating operation;

Figure 4 is a transverse section upon the line 4—4 of Figure 2;

Figure 5 is a transverse section upon the line 5—5 of Figure 2;

Figure 6 is a bottom view of the unit looking in the direction of the arrows upon the line 6—6 of Figure 2 and shows the relationship of the locking cutting arms prior to expansion; and Figure 7 is a bottom view of the unit looking in the direction of the arrows upon the line 7—7 of Figure 3 and shows the locking arms in their expanded locking condition.

In the drawings the insert constructed in accordance with the present invention is indicated generally by the reference character 10 and the tool used in seating it, illustrated in Figure 1, bears the reference character 11. The cooperative capabilities of the tool and of the unit make possible the performance of the improved method, although it is to be understood that other tools can be used and that the method can be performed entirely manually. Before turning to the detailed description of the insert unit 10 itself reference will be made to the tool 11 which may be described briefly as an electric drill 12 of usual design including a handle 13 provided with a current-controlling switch 14 through which current from leads 16 passes to an unshown driving motor positioned within the drill body. A chuck 17 at the lower end of the drill is rotated and to it is connected an accessory unit 18 which is held non-rotatably relative to the drill 12 by an arm 19. Chuck 21 of unit 18 displaceably seats a working tool 22 comprising a vertical shaft having a reduced lower end or shank 23 across which extends a transverse pin 24. Unit 18 also is provided with a control arm 25 by which the user controls the operation of the unit so that the tool 22 rotates, or rotates and reciprocates simultaneously. The construction of unit 18 is not of the essence of this invention, it being sufficient that some means be provided capable of providing a rotational force and/or a rotational and reciprocating hammering action combined at the tool 22.

Turning now to the insert 10, the latter is shown in Figure 2 positioned within a cylindrical bore or hole 27 formed in a body 28 of material such as concrete. Hole 27 has been formed, as by drilling, by means forming no part of the present invention and the insert 10 has been positioned at the bottom thereof. In Figure 2 unit 10 is illustrated in its initial unused condition and is seen to comprise a cylindrical body 31 provided with a longitudinally extending central bore 32 which is screw threaded downwardly from its top for the greater part of the length of the body 31 to end in a tapered inner end 33. Longitudinally extending slots or recesses 34 are formed in the walls of the body 31 from its outer end to a point spaced above its inner end 33. A plurality of arcuately spaced slots 37 extend from the lower end of the unit to a point approximately adjacent the inner end of threaded part of the bore 32 and divide the lower end of body 31 into a plurality, four in the embodiment illustrated, segments or arms 38. In the initial or new relationship of the unit the interior surfaces of each of these arms converge inwardly and downwardly to form the tapered inner end 33 of bore 32, as illustrated clearly in Figure 2.

To enable the arms 38 to cut or to wear away the surrounding material 28 when the unit is rotated, as will be described, each arm, although it is not essential that all of the arms be so provided, carries an abrasive or cutting surface or edge. In the embodiment illustrated two of the arms 38 carry longitudinally extending fixedly seated extremely hard cutting elements 46 which may be retained in place either mechanically, by being cast or welded therein, or by any suitable means. The other two arms 38 are formed upon their exterior surfaces with a multiplicity of small hardened projections or tits which may be integral or may instead be particles of extremely hard abrasive material, such as silicon carbide or tungsten carbide, embedded in the arm surfaces. These surfaces are indicated by the reference characters 47.

The insert unit is completed by the presence of an expander plug 41 having a frusto-conical lower end 42 conforming approximately to the taper of the lower end 33 of the unit bore 32 and having a length substantially equal to that of the arms 38. With the insert unit new the expander plug 41 rests substantially at the top of the tapered end 33, that is, at the upper ends of the arms 38.

The insert constructed in accordance with the present invention, as previously stated, is illustrated in Figure 2 in the position it takes upon having been positioned within a drilled hole or bore. The plug 41 is at its uppermost position and the reduced end 23 of the working tool 22 has been inserted in the bore 32 with the transverse pin 24 extended into the diametrically opposed slots 34. The external dimensions of the unit conform closely to the internal dimensions of the hole 27. To lock the unit in place according to the present invention the segments or arms 38 are expanded, the hole 27 being cut away to provide a tapered undercut into which the arms 38 extend and in which they are retained by the plug 41. The method of accomplishing this will now be described.

With the unit 10 arranged as illustrated in Figure 2 and with the tool 11 in contact therewith at its working tool 22 the operator closes the switch 14 whereupon the unshown drill motor is energized. The control lever 25 of the unit 18 is so positioned that the tool 22 is simultaneously rotated and reciprocated vertically. As is shown in Figure 2, the extremity of the shank 23 of tool 22 contacts the expander plug 41, the pin 24 extending within the insert slots 34 to make this possible. Rotation of the tool 22 effects the rotation of the insert, the rotating force being transmitted through the pin 24. The reciprocating hammering action of tool 22 drives the expander plug 41 inwardly simultaneously with the rotation of the unit so that its frusto-conical end 42 is forced against the inner faces of the arms 38 forming the converging tapered end 33. As a result the arms 38 are forced outwardly in the sense of being expanded, their connection with the main portion of body 31 being sufficiently malleable and tough as to permit pivotal movement between the positions illustrated in Figure 2 and Figure 3 without breaking. The rotation of the arms 38 while being expanded by the force exerted by the wedge 41 causes their abrasive surfaces to cut into and wear away the surrounding material 28, the material displaced collecting in the bottom of the hole 27. The continued inward movement of the plug 41 from the position of Figure 2 to its position in Figure 3 effects the outward movement of the arms 38 to their positions shown in the latter figure. This movement of the plug and the outward pivotal movement of the arms is, of course, a gradual one and takes place only as the material surrounding the arms 38 is cut or worn away by the abrading surfaces or elements 46 and 47. In their initial positions the arms 38 were arranged relative to each other as shown in the bottom view of Figure 6. In their final expanded position they are related as shown in the bottom view of Figure 7. When substantially in their outermost lateral position the operator may drive the plug 41 to its end position by the continued rotation and beating action or he may instead adjust the lever 25 of unit 18 so that only a beating hammering action is provided. In that event the wedge element 41 would be forced downwardly by a rapid succession of hammer blows, the arms 38 being greatly compressed against the surrounding material 28.

At the conclusion of the seating of the unit the tool 22 is withdrawn, the pin 24 being readily removed outwardly from the slots 34. The insert, however, cannot be displaced for it is positively locked in the hole, its expanded arms 38 being wedged under the outward taper at the bottom of the hole itself by the plug 41.

While the particular apparatus herein shown and described in detail is fully capable of attaining the objects and providing the advantages hereinbefore stated, it is to be understood that it is merely illustrative of the presently preferred embodiments of the invention and that no limitations are intended to the details of construction or design herein shown other than as defined in the appended claims.

I claim:

1. An insert comprising a cylindrical body externally smooth-surfaced and provided upon its cylindrical surface for a part of its length adjacent one end with abrasive means to undercut in enclosing bore upon being rotated, wedging means movable longitudinally in said body to effect the expansion thereof at its surface carrying said abrasive means, and diametrically apposed slots in the end of said body spaced from said abrasive means to seat lateral projections upon a rotating hammering tool to receive a rotating force therefrom as it drives said wedging means to expand said body, said slots having a longitudinal extent of the magnitude of the length of said body to be expanded.

2. An expansible anchor shell adapted to be inserted in a suitable bore and on rotation of the shell to form an undercut at the inner end of the bore to prevent withdrawal of the shell, said shell comprising a tubular body externally smooth-surfaced for a part of its length and provided at its other end with an integral expansible portion having abrasive means on its peripheral surface adapted to undercut the enclosing bore upon being rotated, said expansible portion having a hollow interior converging toward the forward end, means comprising a longitudinally movable wedging element to expand the forward end of said body and force said abrasive means laterally, and means comprising a tool seat in said body, to lock a tool against relative rotation while permitting relative longitudinal movement and adapted to receive a rotating force from a rotating and hammering tool serving both to rotate the shell and to urge the wedging element forwardly.

3. An expansible anchor shell adapted to be inserted in a suitable bore and rotated to provide an undercut in the bore to prevent subsequent removal of the inserted shell, said shell comprising a tubular body initially conforming generally to the bore, and having at its forward end an integral expansible portion provided with a peripheral abrading surface and a converging interior, means comprising a longitudinally movable wedging element within the shell coacting with the expansible portion of said shell to force the abrading surface against the wall of the bore as the wedging element is forced forwardly within said expansible portion, and means at the rear portion of the shell spaced from the expansible portion, adapted to coact with a combined rotating and hammering tool serving both to rotate the shell and to drive the wedging element forwardly, said coacting means serving to lock the tool against rotation while permitting relative longitudinal movement thereof.

4. An expansible shell adapted to be inserted and anchored in a bore of a body of relatively soft material, said shell comprising a tubular body threaded from one end for a portion of its length and ending in an expansible portion having an internal converging conical surface, said body being formed with arcuately spaced slots extending the length of said conical surface, said slots dividing said body into a plurality of elongated spaced sectoral abrading arms the outer surfaces of which conform to the curvature of said cylindrical body, each of said arms including a longitudinally extending abrading surface serving to abrade the wall of the enclosing bore upon said arms being expanded and upon the rotation of said shell, said abrading surfaces having insufficient radial extension beyond the surface on which they are positioned to effect of themselves any effective retaining force to prevent the longitudinal displacement of said insert from said bore, wedging means slidable within said shell and coacting with said converging portion to force the abrading arms outwardly, and tool receiving means comprising a longitudinally extending slot at the opposite end of the shell from the expansible portion adapted to receive a laterally extending projection upon a rotating and hammering tool to prevent relative rotation between said body and said tool and to enable said tool to exert a rotating force on said body at various longitudinal positions relative thereto.

References Cited in the file of this patent

UNITED STATES PATENTS

| | | |
|---|---|---|
| 1,330,385 | Muden | Feb. 10, 1920 |
| 1,621,598 | Phillips | Mar. 22, 1927 |
| 1,752,999 | Phillips | Apr. 1, 1930 |
| 1,762,349 | Phillips | June 10, 1930 |
| 2,353,851 | Rosan | July 18, 1944 |
| 2,370,327 | Rosan | Feb. 27, 1945 |

FOREIGN PATENTS

| | | |
|---|---|---|
| 569,774 | Great Britain | June 7, 1945 |